United States Patent Office 3,334,114
Patented Aug. 1, 1967

3,334,114
OXO-PENTAMETHYLENE-IMIDAZOLIDINES
Rudolf G. Griot, Florham Park, N.J., assignor to Sandoz Inc., Hanover, N.J.
No Drawing. Filed Mar. 4, 1964, Ser. No. 349,487
28 Claims. (Cl. 260—309.7)

This invention concerns 5-oxo-1,2-pentamethylene-imidazolidines, intermediates therefor, pharmaceutically acceptable acid addition salts thereof and methods for preparing same. The basic structure of these compounds is reflected by the formula

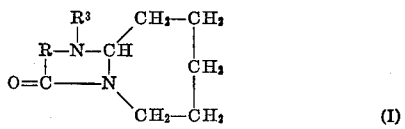

wherein R is the residue of a primary α-amino acid, $H_2N-R-COOH$, having only one primary amino group; and
$R^3$ is either hydrogen (—H); lower alkyl, e.g. methyl, ethyl and propyl; lower alkenyl, e.g. allyl; lower alkynyl, e.g. propynyl; lower alkyl carbonyl, e.g. —$COCH_3$; amidobenzene; nitroso; primary amino; lower alkyl (secondary)amino, e.g. isopropylamino; phenyl(lower alkyl), e.g. benzyl; lower alkyl amido, e.g. acetamido; phenyl-keto-(lower alkylene), e.g. phenyl-keto-trimethylene; or para-fluorophenyl-keto-(lower alkylene), e.g. para-fluorophenyl-keto-trimethylene.

The only prerequisites of the α-amino acid (II) are (a) that it be an α-amino carboxylic acid, and (b) that the α-amino group be a primary amino group and (c) that the α-amino group be the sole primary amino group.

It is preferred that the primary α-amino acid be a monocarboxylic acid as is each of those enumerated in Table A.

The primary α-amino acid, $H_2N-R-COOH$, is one wherein

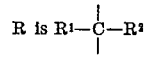

Each of $R^1$ and $R^2$ is, independently, either hydrogen (—H); lower alkyl, e.g. methyl, isopropyl and butyl; hydroxy (lower) alkyl, e.g. α-hydroxyethyl; lower alkyl thio lower alkyl, e.g. methyl thioethyl; phenyl(lower)alkyl, e.g. benzyl; substituted benzyl wherein the substituents comprise hydroxy (—OH), bromine (Br) and iodine (—I) and are directly bound to a ring carbon atom, e.g. parahydroxybenzyl; indolyl(lower)alkyl, e.g. 3-indolyl-methyl; imidazole(lower)alkyl, e.g. 4(or 5)-imidazolemethyl; and phenyl. According to this invention, $R^2$, independently, has any of the meetings of $R^1$.

Alternatively, $R^1$ and $R^2$ are, together, either a saturated, e.g. pentamethylene, or an ethylenically unsaturated, e.g. pentadienyl-1,3-, hydrocarbon chain. According to this definition, $R^1$ and $R^2$ together with the carbon atom to which they are both attached form a carbocyclic ring of from 3 to 9 carbon atoms.

The following Table A reflects some of the contemplated primary α-amino acids and the corresponding definitions of $R^1$ and $R^2$:

TABLE A

| Name | Formula | $R^1$ | $R^2$ |
|---|---|---|---|
| 1. Glycine | $CH_2(NH_2)COOH$ | H | H |
| 2. α-Alanine | $CH_3CH(NH_2)COOH$ | $CH_3$ | H |
| 3. Serine | $HOCH_2CH(NH_2)COOH$ | $HOCH_2$ | H |
| 4. Threonine | $CH_3CH(OH)CH(NH_2)COOH$ | $CH_3CH(OH)$ | H |
| 5. Valine | $(CH_3)_2CHCH(NH_2)COOH$ | $(CH_3)_2CH$ | H |
| 6. Methionine | $CH_3S(CH_2)_2CH(NH_2)COOH$ | $CH_3S(CH_2)_2$ | H |
| 7. Phenylalanine | ⌬—$CH_2CH(NH_2)COOH$ | ⌬—$CH_2$ | H |
| 8. Dibromotyrosine | $HO$—⌬(Br,Br)—$CH_2CH(NH_2)COOH$ | $HO$—⌬(Br,Br)—$CH_2$ | H |
| 9. Tryptophane | (indole)—$CH_2CH(NH_2)COOH$ | (indole)—$CH_2$ | H |
| 10. Histidine | (imidazole)—$CH_2CH(NH_2)COOH$ | (imidazole)—$CH_2$ | H |
| 11. α-Amino isobutyric acid | $H_2NC(CH_3)_2COOH$ | $CH_3$ | $CH_3$ |
| 12. α-Phenyl glycine | ⌬—$CH(NH_2)COOH$ | ⌬ | H |
| 13. α-Amino-cyclohexane carbonic acid | ⌬(NH_2)(COOH) | —$CH_2CH_2CH_2CH_2CH_2$— | |
| 14. α-Methyl-α-phenyl glycine | $H_2NC(CH_3)COOH$ with phenyl | ⌬ | $CH_3$ |

The compounds of this invention are prepared in several steps starting with an alpha-amino acid and any caprolactim ether, such as a lower alkyl ether, e.g. the methyl or ethyl ether, or corresponding thioether according to the reaction schemes:

(A) 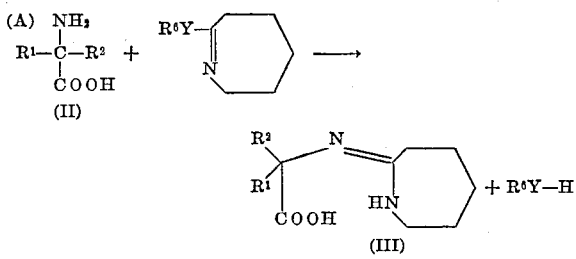

See Liebigs Ann., 623, 166 (1959); German Patent 1,082,268 and U.S. Patent 3,002,000 for the preparation of caprolactim methyl ether, reference is made to Benson, R. E., and Cairns, T. L., J.A.C.S., 70, 2115 (1948).

(B) 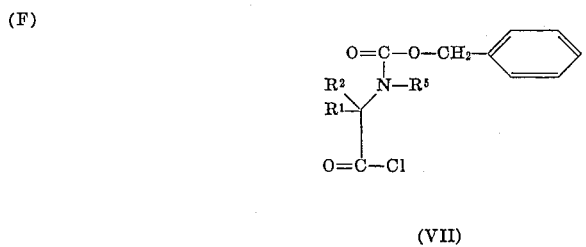

(C) 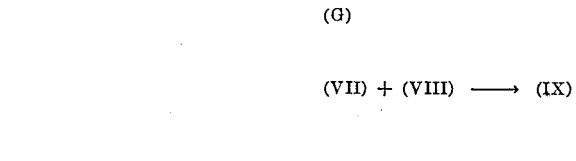

In equations (A), (B) and (C):

each of $R^1$ and $R^2$ has the definition hereinbefore ascribed thereto;

$R^6$ is either lower alkyl, e.g. methyl, ethyl, isopropyl and butyl; phenyl; or phenyl(lower)alkyl, e.g. benzyl; and Y is either oxygen or sulfur.

Methylation of (V) may be effected according to procedure reported by Eschweiler and Clarke, "J.A.C.S.," 55, 4571 (1933) [a special case of the Leuckhard Reaction—compare "Organic Reactions," V, page 305]:

(D) 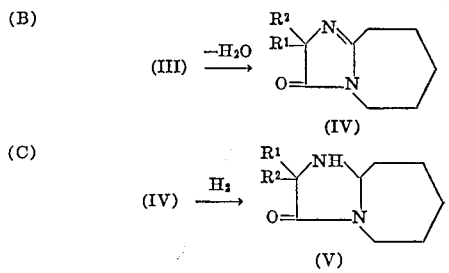

A more general alkylation procedure, however, is:

(E) 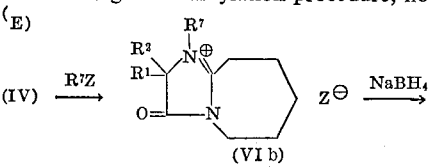

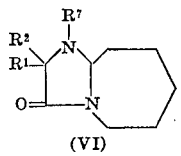

wherein each of $R^1$ and $R^2$ has its previously ascribed meaning; $R^7$ is lower alkyl, e.g. methyl, ethyl, propyl, isopropyl, butyl and amyl; and Z is a halogen, e.g. chlorine and bromine, atom.

Other substituents are introduced and corresponding acid addition salts are prepared according to methods exemplified in the specific examples which follow.

An alternative method of producing compounds (V) and (VI) starts with the carbobenzoxy-α-amino acid chloride (VII) with proceeds according either to reaction (F) or reaction (G).

(F)

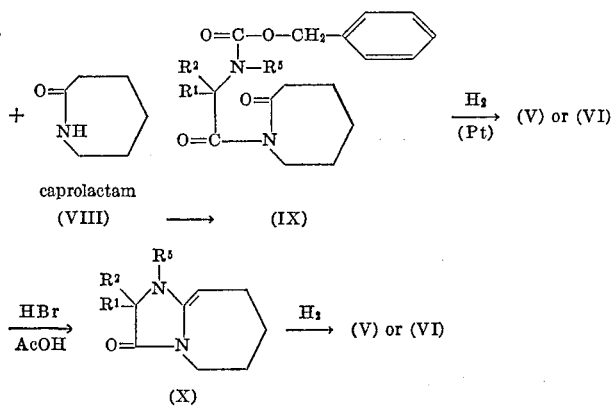

(G)

(VII) + (VIII) ⟶ (IX) $\xrightarrow[\text{AcOH}]{\text{HBr}}$ 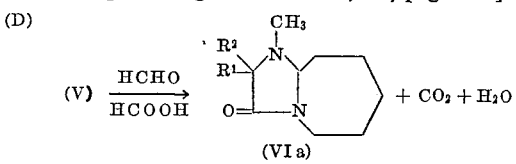 $\xrightarrow{H_2}$ (V) or (VI)

In reactions (F) and (G) $R^5$ is either hydrogen (—H) or lower alkyl, preferably lower alkyl with from one to four carbon atoms, e.g. methyl, ethyl, propyl and butyl. Whether (V) or (VI) is produced depends only upon whether $R^5$ is hydrogen or lower alkyl. $R^1$ and $R^2$ have the same meanings as heretofore defined.

Compounds (X) are novel intermediates which are exemplified by the compound wherein each of $R^1$ and $R^2$ is hydrogen (—H) and $R^5$ is methyl (—$CH_3$).

To prepare a compound (X) with substituents in each of positions, $R^1$, $R^2$ and $R^5$, one starts with a compound, such as 2-methylamino-isobutyric acid (see Beilstein H4, 416), and carbobenzoxylates same (see Greenstein, Jesse P., and Winitz, Milton, "Chemistry of the Amino Acids," vol. 2, page 891, John Wiley & Sons, Inc., 1961). The corresponding acid chloride is then prepared from the carbobenzoxylated α-amino acid (Greenstein, Jesse P., and Winitz, Milton, ibid, pages 965 to 968). The obtained acid chloride is then reacted with caprolactam. The reaction product is treated with an acetic acid solution of hydrogen bromide, as indicated by reaction (G), to yield the compound of the formula

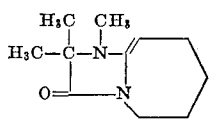

The acid addition salts are those which are pharmacologically acceptable and include, inter alia, the hydrochlorides, fumarates, maleinates, tartrates, methane sulfonates, salicylates and hydrosulfates. The acid addition salts of compounds (IV) are intermediates for the corresponding acid addition salts of compounds (V) and (VI). All acid addition salts of compounds (V) and (VI), and their precursors, are within the scope of this invention. Those which are not therapeutically acceptable can be converted to their corresponding free bases or to pharmaceutically acceptable acid addition salts by known procedures. The noted acids of addition are merely exemplary.

The following examples illustrate the invention, the parts and percentages being by weight unless otherwise stated, and the relationship of parts by weight to parts by volume being the same as that of the kilogram to the liter. All temperatures are in degree centigrade.

EXAMPLE 1

*Methanol adduct of N-(azacycloheptan-2-yl) aminoacetic acid*

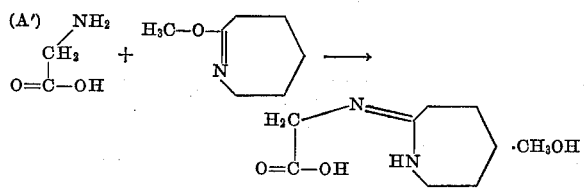

Suspend 11.25 parts of glycine (0.15 mole) in 70 parts by volume of methanol and stir vigorously. To the resulting suspension add (in one portion) 25 parts (0.225 mole) of caprolactim-methylether, and stir the product at room temperature (about 20°) over night (17 to 20 hours). Reaction (A′) takes place.

Add 70 parts by volume of diethyl ether to the resultant admixture, and filter the crystalline reaction product produced. Dry said crystalline reaction product at 60°/12 millimeters (mm.) Hg for from two to four hours to obtain crude (yet sufficiently pure) title compound containing one molecule of methanol; melting point (M.P.) 174° with decomposition. The yield thus obtained is between 90 and 100 percent by weight based on the initial weight of glycine employed.

EXAMPLE 2

*5-oxo-1,2-pentamethylene-imidazoline*

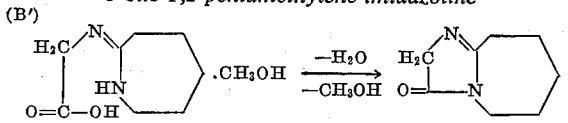

Place 27 parts (0.133 mole) of the methanol adduct (M.P. 174°), prepared according to Example 1, in a round bottomed flask connected to a water separator. Add thereto a mixture of 200 parts by volume of toluene and 20 parts by volume (containing 0.100 part of paratoluenesulfonic acid) of dimethylformamide. Heat the resulting admixture to reflux.

Remove the first 50 parts by volume of refluxing solvent which contains the adducted methanol of the starting material. Reflux the remainder for about two hours (until no more water is split off and the boiling material is fully dissolved). Remove the solvents by distillation from a water bath in vacuo (10⁻³ mm. Hg). Distill the remaining yellow-green colored oil from an oil bath in vacuo. The boiling point (B.P.) of the distillate is 90°/0.01 mm. Hg. The yield is about 70 percent by weight based upon the weight of the starting methanol adduct. The oil product is viscous and solidifies at room temperature.

An analysis of said product, $C_8H_{12}N_2O$, reveals—Calculated: C, 63.1%; H, 8.0%; N, 18.4%. Found: C, 63.1%; H, 7.9%; N, 18.2%.

EXAMPLE 3

*Hydrochloride of 5-oxo-1,2-pentamethylene-imidazoline*

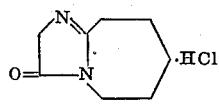

Dissolve the oil product of Example 2 in equal parts of isopropanol. To the resulting solution add sufficient 20 percent hydrogen chloride (in isopropanol) to neutralize said oil product. Precipitate the title hydrochloride by cooling the neutralized material to 0°. Said hydrochloride precipitates as colorless leaves, M.P. 243°. Filter the precipitate from its mother liquor. Add dry diethylether to the mother liquor filtrate until the resulting solution turns turbid. A further amount of crystals of the title hydrochloride is thus obtained. The total yield is from 80 to 90 percent by weight based upon the starting weight of the oil product of Example 2.

An analysis of the hydrochloride, $C_8H_{12}N_2O \cdot HCl$, reveals—Calculated: C, 50.9%; H, 6.9%; N, 14.8%; Cl, 18.8%. Found: C, 51.1%; H, 7.3%; N, 14.5%; Cl, 18.9%.

EXAMPLE 4

*5-oxo-1,2-pentamethylene-imidazolidine*

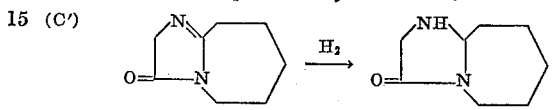

Dissolve 4.0 parts (0.0264 mole) of 5-oxo-1,2-pentamethylene-imidazoline (the title compound of Example 2 in free base form) in 20 parts by volume of 80 percent (aqueous) acetic acid. Add 0.2 part of platinum dioxide to the resulting solution, and hydrogenate the produced mixture in Parr Apparatus, starting at a pressure of about 50 pounds per square inch (p.s.i.g.).

When the hydrogenation is complete, filter off the catalyst and evaporate the solvent in vacuo. The remainder is the acetic acid addition salt of the title compound. Dissolve said salt in 20 parts by volume of water. Add thereto 10 parts of potassium carbonate. Extract the resulting solution with chloroform in a continuous extraction apparatus (Kutscher-Steudel type) until the aqueous phase is exhausted. Dry over potassium carbonate and remove the remaining solvent in vacuo. Distil.

The yield of the title compound (95°/0.01 mm.) is about 80 percent based on the weight of the initial free base. In similar manner all acid addition salts of compounds (I) are converted into the corresponding free base.

The hydrochloride of the title compound is prepared according to the same procedure starting with the hydrochloride of Example 3 (instead of the title compound of Example 2) and using ethyl alcohol as the solvent in place of acetic acid.

The hydrochloride of the title compound is also prepared in the same manner as described in Example 3, but starting with the title compound of Example 4, rather than that of Example 2. Said hydrochloride, recrystallized from methanol/ether, melts at 164°.

An analysis of said hydrochloride, $C_8H_{14}N_2O \cdot HCl$ reveals—Calculated: C, 50.4%; H, 7.9%; N, 14.7%; Cl, 18.6%. Found: C, 50.3%; H, 8.0%; N, 14.8%; Cl, 18.5%. Hydrochlorides of all compounds (I) are prepared in this manner.

The maleinate of the title (base) is also readily prepared. Dissolve equivalent amounts of maleic acid and said base in absolute (ethyl) alcohol, and add diethyl ether to the resultant solution. The maleinate formed precipitates overnight. Recrystallize from methanol.

In similar manner any acid addition salt may be prepared from any compound (I).

EXAMPLE 5

*3-methyl-5-oxo-1,2-pentamethylene-imidazolidine*

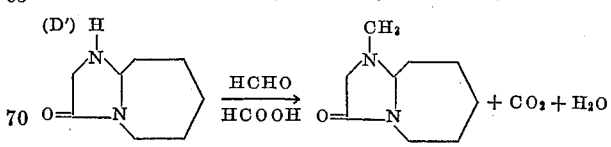

Admix 2.5 parts (0.016 mole) of secondary amine (title compound of Example 4) with 1.42 parts (0.018 mole) of 37% (aq.) formaldehyde and 3.3 parts (0.065 mole) of 99% (aq.) formic acid. Heat the resulting admixture under nitrogen in an oil bath of 120° for 3 hours. Add 10 parts by volume of 2 N hydrochloric acid, and evaporate the resulting solution in vacuo to dryness.

Dissolve the residue (containing crude hydrochloride of the title compound and formaldehyde polymer) in 10 parts of water, and extract the product several times with ethyl acetate.

Add slowly (to avoid excessive foaming) 5 parts of potassium carbonate ($K_2CO_3$) to the aqeous phase, and extract the free base (the title compound) from the resultant with chloroform in a continuous extraction apparatus. Dry the produced chloroform solution over potassium carbonate, and then evaporate the solvent. Distil the secondary amine in vacuo, B.P. 80° to 84°/0.12 mm. Hg. A yield of 1.8 to 2.0 parts of said secondary amine is thus obtained.

To form the hydrochloride of the title (base) compound, neutralize the base with a 20 percent (in isopropanol) solution of hydrogen chloride gas, add acetone to the product, and cool to 0°. The hydrochloride precipitates in crystalline form. Filter the precipitate, and wash same with acetone/ether (1:1), M.P. 173° to 175°. The yield thus obtained is from 75 to 80 percent based on the weight of the starting base compound.

An analysis of said hydrochloride, $C_9H_{17}ClN_2O$, reveals—Calculated: C, 52.8%; H, 8.4%; N, 13.7%; Cl, 17.3%. Found: C, 52.3%; H, 8.5%; N, 13.8%; Cl, 17.4%.

EXAMPLE 6

*3-acetyl-5-oxo-1,2-pentamethylene-imidazolidine*

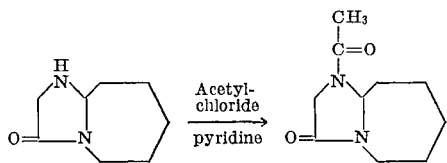

Add 4.24 parts of acetylchloride to a frozen mixture of 7.13 parts of the title compound of Example 4 in 70 parts by volume of benzene and 7.25 parts of pyridine, and keep the resultant refrigerated (about 8°) over night (17 to 19 hours). Admix the thus-obtained material with 100 parts by volume of ice-water and make alkaline with 2 N sodium carbonate ($Na_2CO_3$). Extract the product with chloroform.

Evaporate the solvent. The residue becomes crystalline. Recrystallize said crystalline residue from acetone/cyclohexane. The yield thus obtained is 4.9 parts, M.P. 108° to 109°.

An analysis of the recrystallized title compound, $C_{10}H_{16}N_2O_2$, reveals—Calculated: C, 61.2%; H, 8.2%; N, 14.3%; O, 16.3%. Found: C, 61.3%; H, 8.4%; N, 14.1%; O, 16.5%.

EXAMPLE 7

*3-nitroso-5-oxo-1,2-pentamethylene-imidazolidine*

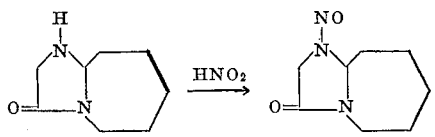

Dissolve 6.0 parts (0.04 mole) of secondary amine (title compound of Example 4) in 30 parts by volume of 1:1 HCl/$H_2O$. Stir the resulting solution while adding thereto 1.5 equivalents of sodium nitrate ($NaNO_2$), in the form of a concentrated aqueous solution, and heating at a sufficient rate to maintain the ensuing reaction temperature at at most room temperature, i.e. about 20°.

When the reaction is completed, allow the resulting admixture to stand at room temperature for 24 hours. An oil separates. Extract the oil with chloroform. Dry the oil/chloroform extract and evaporate the solvent therefrom. Distil the residue at 100°/0.037 mm. Hg. Recrystallize the solid distillate from diethylether, M.P. 68° to 69°.

An analysis of the recrystallized product, $C_8H_{13}N_3O_2$, reveals—Calculated: C, 52.4%; H, 7.2%; N, 22.9%; O, 17.5%. Found: C, 52.9%; H, 7.3%; N, 22.8%; O, 17.4%.

EXAMPLE 8

*3-amino-5-oxo-1,2-pentamethylene-imidazolidine hydrochloride*

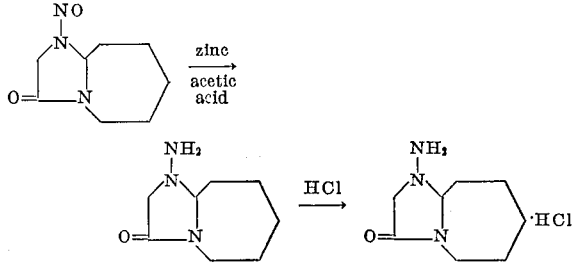

Dissolve 2.0 parts of nitroso compound (title compound of Example 7) in 30 parts by volume of acetic acid. Add gradually 5 parts of zinc metal dust to the resulting solution while stirring at 20°. Continue the stirring for an additional hour. Filter. Add an excess of 30% (aq.) sodium hydroxide to the residue to render same alkaline. Extract the base from the alkaline product with chloroform. Remove the solvent in vacuo. Acidify the remaining crude amine (the free base corresponding to the title compound) with an isopropanol solution of hydrogen chloride. Add charcoal to the resulting solution to decolorize same. Filter off the charcoal, and add diethyl ether to the filtrate. The title hydrochloride is thus precipitated. Recrystallize the precipitated hydrochloride from diethylether/ethanol, M.P. 192° with decomposition.

An analysis of the recrystallized product, $C_8H_{15}N_3O \cdot HCl$ reveals—Calculated: N, 20.1%; Cl, 17.3%. Found: N, 20.4%; Cl, 17.0%.

EXAMPLE 9

*3-propynyl-5-oxo-1,2-pentamethylene-imidazolidine*

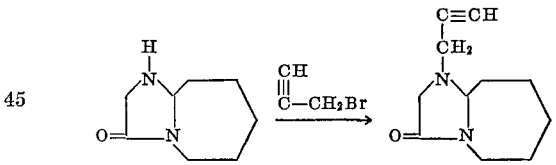

Admix 23.0 parts of secondary amine (title compound of Example 4), 25 parts of potassium iodide and 200 parts by volume of dimethylformamide (DMF). Heat the resulting admixture of 100° on a boiling water bath. Add dropwise thereto 20.8 parts of propargyl bromide, and thereafter maintain the resultant reaction mixture at 100° for two hours.

Evaporate the solvent in vacuo. To free the base (title compound), add aqueous potassium carbonate solution to the residue. Evaporate the obtained organic phase. Distil the remaining oil, B.P. 115°/0.005 mm. Hg.

The hydrochloride, prepared from said oil in a manner analogous to that described in Example 3, melts at 162° to 163° after recrystallization from isopropanol.

An analysis of the hydrochloride, $C_{11}H_{17}N_2OCl$, reveals—Calculated: C, 57.8%; H, 7.5%; N, 12.2%; O, 7.0%; Cl, 15.5%. Found: C, 57.5%; H, 7.7%; N, 12.1%; O, 7.0%; Cl, 15.9%.

EXAMPLE 10

*3-propenyl-5-oxo-1,2-pentamethylene-imidazolidine*

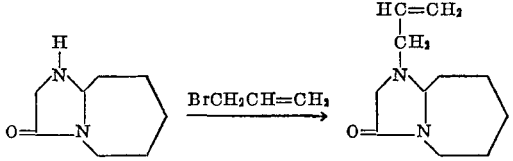

Admix 23.0 parts of secondary amine (title compound of Example 4), 25 parts of potassium iodide and 200 parts by volume of DMF. Heat the resulting admixture to 100° on a boiling water bath. Add dropwise thereto 21.2 parts of allyl bromide, and thereafter maintain the resultant reaction mixture at 100° for two hours.

Evaporate the solvent in vacuo. To free the base (title compound), add aqueous potassium carbonate solution to the residue. Evaporate the obtained organic phase. Distil the remaining oil, B.P. 103°/0.1 mm. Hg. The refractive index, $\mu_D^{20}$, of said oil is 1.509.

A 72 percent yield, based on the weight of starting amine, is thus obtained.

An elemental analysis of the product, $C_{11}H_{18}N_2O$, reveals—Calculated: C, 68.0%; H, 9.3%; N, 14.4%. Found: C, 67.3%; H, 9.4%; N, 14.5%.

To prepare the oxalate of the title compound, dissolve the latter in absolute ethanol. Add to the resultant equivalent (equimolecular amount) of oxalic acid dissolved in methanol/ethanol. To the product add diethyl ether until crystals precipitate. Said crystals are the desired oxalate, M.P. 112° to 113°.

An elemental analysis of the oxalate, $C_{13}H_{20}N_2O_5$, reveals—Calculated: C, 54.9%; H, 7.1%; N, 9.9%; O, 28.1%. Found: C, 55.1%; H, 7.3%; N, 9.7%; O, 28.1%.

Other acid addition salts are prepared from the title compound and from all compounds (I) in an analogous manner. The methanesulfonate, prepared in this manner, M.P. 116° to 117°, has an elemental analysis, $C_{12}H_{22}N_2O_4S$—Calculated: C, 49.6%; H, 7.6%; N, 9.6%; S, 11.0%. Found: C, 49.6%; H, 7.9%; N, 9.3%; S, 11.2%.

EXAMPLE 11

*3-propyl-5-oxo-1,2-pentamethylene-imidazolidine*

(a)

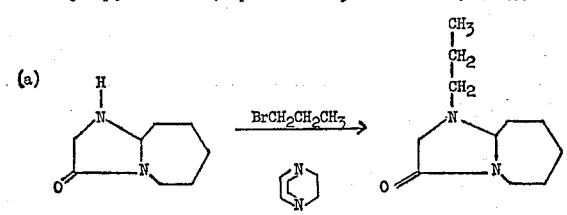

Reflux a mixture of 6.18 parts of secondary amine (title compound of Example 4), 10 parts of potassium iodide, 2.25 parts of 1,4-diazobicyclo[2,2,2] octane and 100 parts by volume of 95% ethanol (aq.). Add 4.92 parts of bromopropane slowly to the refluxing mixture. After refluxing the resultant reaction admixture for 18 hours, evaporate the solvent therefrom. Free the base, i.e. work up the residue, in the same manner as described in Examples 9 and 10. Add aqueous potassium carbonate solution to said residue. Evaporate the obtained organic phase. Distil the remaining oil in vacuo. A mixture of the secondary amine (title compound of Example 4) and the instant title compound is thus obtained.

Precipitate the maleinate (4 parts) of said secondary amine (see Example 4) and separate the precipitate by filtration. Evaporate the solvent from the filtrate. Add aqueous potassium carbonate solution to the residue. Evaporate the obtained organic phase. Distil the remaining oil in vacuo. 1.1 part of the title compound, B.P. 80° to 85°/0.01 mm. Hg, $\mu_D^{20}=1.495$, is thus obtained.

The results of an elemental analysis for $C_{11}H_{20}N_2O$ are—Calculated: C, 67.3%; H, 10.3%; N, 14.3%. Found: C, 67.4%; H, 10.5%; N, 14.5%.

(b)

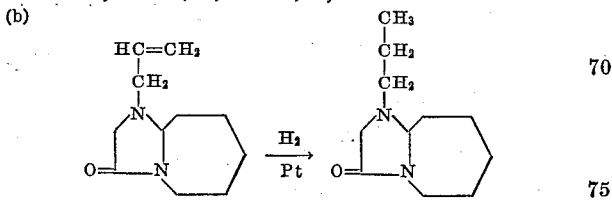

Hydrogenate in ethanolic solution the title compound of Example 10 using platinum dioxide as hydrogenation catalyst. The instant title compound is thus produced, as confirmed by infrared spectra.

EXAMPLE 12

*3-[4'-(1'-phenyl-1'-oxo)-butyl]-5-oxo-1,2-pentamethylene-imidazolidine hydrochloride*

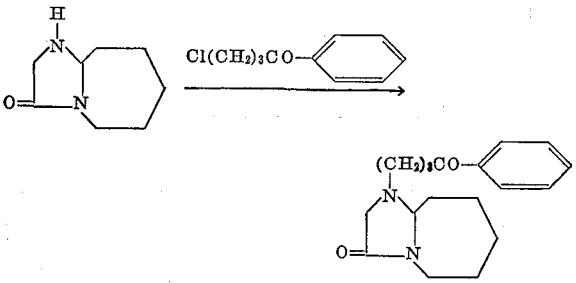

Heat for fifteen hours on a boiling waterbath a mixture of 23 parts of secondary amine (title compound of Example 4), 200 parts by volume of DMF, 25 parts of potassium iodide and 27.3 parts of γ-chlorobutyrophenone. Evaporate the solvent in vacuo from the resultant. Admix aqueous potassium carbonate solution with the residue until the admixture is alkaline. Extract the title (base) compound from the alkaline admixture with chloroform. Distil the base, B.P. 170° to 180°/0.005 mm. Hg, to obtain 5.6 parts of viscous oil.

Neutralize the viscous oil with an ethanolic solution of hydrogen chloride. To the product add acetone. The hydrochloride, M.P. 165.5° to 167.5°, is thus precipitated as crystals. An elemental analysis of said hydrochloride, $C_{18}H_{25}ClN_2O_2$, yields—Calculated: C, 64.2%; H, 7.5%; N, 8.3%; Cl, 10.5%; O, 9.5%. Found: C, 64.1%; H, 7.6%; N, 8.5%; Cl, 10.9%; O, 9.6%.

EXAMPLE 13

*3-[4'(1'-p-fluorophenyl-1'-oxo)-butyl]-5-oxo-1,2-pentamethylene-imidazolidine hydroiodide*

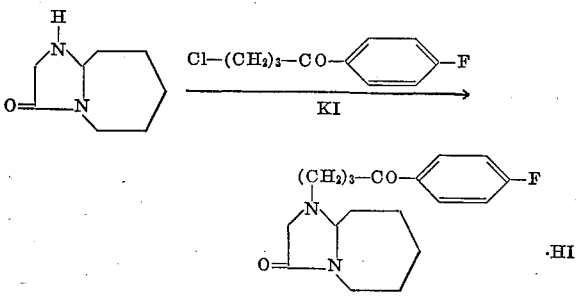

Stir for eighteen hours at 100° a mixture of 70 parts of potassium iodide, 90 parts of p-fluoro-γ-chlorobutyrophenone and 80 parts by volume of DMF. Evaporate the solvent from the resultant in vacuo. Admix methanol with the residue. The yellow precipitate, M.P. 195° to 196°, formed (35 parts) is the title compound.

Recrystallize from water, and decolorize with charcoal. After recrystallization and decolorizing the melting point is 196° to 198°. An elemental analysis of the recrystallized product $C_{18}H_{24}FIN_2O_2$, yields—Calculated: C, 48.4%; H, 5.4%; N, 6.3%; I, 28.4%; Found: C, 48.8%; H, 5.3%; N, 6.0%; I, 28.3%.

EXAMPLE 14

*3-benzyl-5-oxo-1,2-pentamethylene-imidolidine*

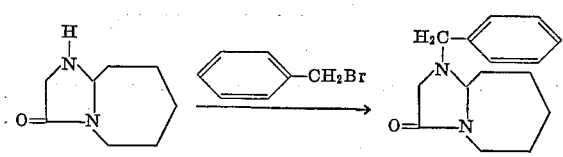

Heat to 100° on a boiling waterbath a mixture of 23.0 parts of secondary amine (title compound of Example 4), 25 parts of potassium iodide and 200 parts by volume of DMF. To the resultant admixture add 29.9 parts of benzyl bromide dropwise, and thereafter maintain same at 100° for two hours.

Evaporate the solvent in vacuo, and set the base (title compound) free with aqueous potassium carbonate solution. Evaporate the organic phase, and distil the remaining oil, B.P. 135°/0.008 mm. Hg, $\mu_D^{20}=1.5547$.

The hydrochloride (prepared as heretofore described) recrystallized from isopropanol has a melting point at 170° to 171°.

An elemental analysis of the hydrochloride,

yields—Calculated: C, 64.2%; H, 7.5%; N, 10.0%; Cl, 12.6%. Found: C, 64.3%; H, 7.8%; N, 9.3%; Cl, 12.8%.

EXAMPLE 15

4-methyl-5-oxo-1,2-pentamethylene-imidazolidine

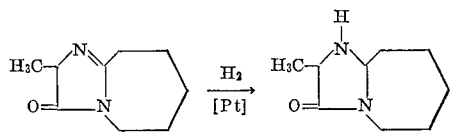

Dissolve 33 parts of 4-methyl-5-oxo-1,2-pentamethylene-imidazoline (prepared in the same manner as described in Examples 1, 2 and 4, starting with alanine and caprolactim-methylether) in 100 parts by volume of 80% (aq.) acetic acid. Hydrogenate the resultant under atmospheric pressure using 0.330 part of platinum dioxide as catalyst. When the hydrogen gas uptake is 98 percent of theory, remove the solvent in vacuo. Add a concentrated aqueous solution of potassium carbonate to the residue to set the base (title compound) free. Evaporate to dryness. A yield of 33 parts of title compound is thus obtained.

EXAMPLE 16

3,4-dimethyl-5-oxo-1,2-pentamethylene-imidazoline

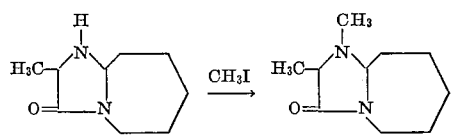

Dissolve 33 parts (0.196 mole) of the title compound of Example 15 in 100 parts by volume of DMF. To the resulting solution add 30.8 parts (0.216 mole) of methyliodide. An exothermic reaction is thus initiated.

After one half hour distil the reaction mixture in vacuo to remove the solvent. Dissolve the residue in water, and set the base free with potassium carbonate. Extract the amine (title compound) from the resultant with chloroform. Dry the produced solution over potassium carbonate, and thereafter remove the solvent therefrom. Distil the residue. B.P. 83° to 85°/0.3 mm. Hg, $\mu_D^{20}=1.498$. A yield of the title compound of 33.6 percent, based on the starting weight of the title compound of Example 15, is thus obtained.

To prepare the corresponding hydrochloride, dissolve the base (instant title compound) in methanol. Neutralize the resultant with an isopropanolic solution of hydrogen chloride. Add ether and refrigerate (at about 8°). The hydrochloride, M.P. 188° to 189.5°, thus precipitates with a yield of 94.5 percent (based on the starting weight of the title compound).

An elemental analysis of the hydrochloride,

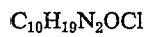

yields—Calculated: C, 54.9%; H, 8.8%; N, 12.8%; Cl, 16.2%. Found: C, 54.4%; H, 8.8%; N, 12.7%; Cl, 15.8%.

As is readily seen, for example, from Examples 10 to 16, substituents are readily introduced on the basic nitrogen atom (the 3-position) of the (secondary amino) imidazolidine by reacting same with a halide according to the reaction:

(G)

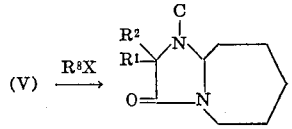

wherein each of $R^1$ and $R^2$ has its heretofore defined meaning, $R^8$ is hydrocarbon [saturated—lower alkyl, e.g. propyl, or lower cycloalkyl, e.g. cyclohexyl; ethylenically unsaturated lower aliphatic, e.g. allyl; acetylenically unsaturated lower aliphatic, e.g. propargyl; phenyl; monocarbocyclic ar(lower)alkyl, e.g. benzyl] or carboxylic acid acyl [(lower)alkyl-keto(lower)alkyl, e.g. propylketo-ethyl; unsubstituted phenyl-keto-(lower)alkyl, e.g. phenyl-keto-propyl; substituted phenyl-keto-(lower) alkyl, e.g. p-fluorophenyl-keto-propyl]; and X is a halogen, e.g. chlorine and bromine, atom.

As is readily appreciated, reaction (G) permits the introduction into the indicated position of innumerable diverse substituents far beyond those instantly exemplified.

All of the compounds of the instant invention possess central nervous system (CNS) activity and are useful accordingly. They are administered either orally or parenterally in daily doses of 125 milligrams. An indication of the spectra of activity and utility of a cross section of compounds according to this invention is reflected in the following table, wherein the compounds are all compounds of formula (VI). In each of the compounds in the table $R^2$ is a hydrogen (—H) atom. $R^1$ and $R^7$ are specifically set forth for each compound.

ACTIVITY AND UTILITY

| $R^1$ | $R^7$ | Example | (*) |
|---|---|---|---|
| —H | —CH₃ | 5 | a d f i |
| —H | —CO—CH₃ | 6 | a b g i |
| —CH₃ | —CH₃ | 16 | e h |
| —H | —H | 4 | a c g i |
| —H | —CH₂—C≡CH | 9 | a c g i |
| —H | —CH₂—CH=CH₂ | 10 | a c g i |
| —H | —C₃H₇ | 11 | a b g i |
| —H | —CO—NH—⟨phenyl⟩ | ---------- | a c g i |
| —H | —NO | 7 | a d f i |
| —H | —NH₂ | 8 | a c g i |
| —H | —(CH₂)₃—CO—⟨phenyl⟩ | 12 | e h |
| —H | —NH—CO—CH₃ | ---------- | a b g i |
| —H | —(CH₂)₃—CO—⟨phenyl⟩—F | 13 | e h |
| —H | —NH—CH(CH₃)₂ | ---------- | a b g i |
| —H | —CH₂—⟨phenyl⟩ | ---------- | a b g i |

*a Monamine oxidase (MAO) inhibiting activity.
 b Produce CNS stimulation.
 c Produce either CNS depression or CNS depression followed by stimulation.
 d Produce a stabilization of motor activity of mice in the "actophotometer."
 e Produce CNS depression and are not MAO inhibitors.
 f Mood stabilizer.
 g Psychic energizer.
 h Sedative or sedative-hypnotic.
 i Antihypertensive agent.

It is thought that the invention and its advantages will be understood from the foregoing description. It is apparent that various changes may be made in the process, the intermediates and in the final products without departing from the spirit and scope of the invention or sacrificing its material advantages, the process, intermediates and final products hereinbefore described being merely illustrative of embodiments of the invention.

What is claimed is:
1. A compound of the formula

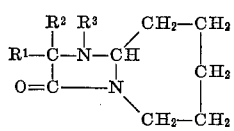

wherein each of $R^1$ and $R^2$ is, independently, a member selected from the group consisting of a hydrogen atom; lower alkyl, hydroxy(lower)alkyl; (lower)alkylthio(lower)alkyl; phenyl(lower)alkyl; benzyl ring-substituted by a substituent selected from the group consisting of hydroxy, a bromine atom and an iodine atom; indolyl(lower)alkyl; imidazole (lower)alkyl; and phenyl; and $R^3$ is a member selected from the group consisting of a hydrogen atom, lower alkyl, lower alkenyl, lower alkynyl, (lower)alkylcarbonyl, amidobenzene, nitroso, primary amino, (lower)alkyl(secondary)amino, phenyl(lower)alkyl, (lower)alkylamido, phenyl-keto-(lower)alkylene and para-fluoro-keto-(lower)alkylene.

2. A compound of the formula

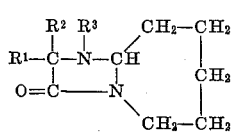

wherein $R^1$ and $R^2$, taken together, with the imidazolidine ring carbon atom to which they are bonded, form an at most ethylenically unsaturated hydrocarbon ring of from 3 to 9 carbon atoms; and $R^3$ is a member selected from the group consisting of a hydrogen atom, lower alkyl, lower alkenyl, lower alkynyl, (lower)alkylcarbonyl, amidobenzene, nitroso, primary amino, (lower)alkyl(secondary)amino, phenyl(lower)alkyl, (lower)alkylamido, phenyl-keto-(lower)alkylene and parafluorophenyl-keto-(lower)alkylene.

3. 5-oxo-1,2-pentamethylene-imidazolidine.
4. 5 - oxo - 1,2 - pentamethylene - imidazolidine hydrochloride.
5. 5-oxo-1,2-pentamethylene-imidazolidine maleinate.
6. 3-methyl-5-oxo-1,2-pentamethylene-imidazolidine.
7. 3 - methyl - 5 - oxo - 1,2-pentamethylene-imidazolidine hydrochloride.
8. 3-acetyl-5-oxo-1,2-pentamethylene-imidazolidine.
9. 3-nitroso-5-oxo-1,2-pentamethylene-imidazolidine.
10. 3-amino-5-oxo-1,2-pentamethylene-imidazolidine.
11. 3 - amino - 5 - oxo - 1,2 - pentamethylene -imidazolidine hydrochloride.
12. 3 - propynyl - 5-oxo-1,2-pentamethylene-imidazolidine.
13. 3 - propynyl - 5 - oxo - 1,2 - pentamethylene-imidazolidine hydrochloride.
14. 3 - propynyl - 5-oxo-1,2-pentamethylene-imidazolidine.
15. 3 - propynyl - 5 - oxo - 1,2 - pentamethylene-imidazolidine oxalate.
16. 3 - propynyl - 5 - oxo - 1,2 - pentamethylene-imidazolidine methanesulfonate.
17. 3-propyl-5-oxo-1,2-pentamethylene-imidazolidine.
18. 3-[1'-(4'-phenyl - 4' - oxo)-butyl]-5-oxo-1,2-pentamethylene-imidazolidine.
19. 3-[4'-(1'-phenyl - 1' - oxo)-butyl]-5-oxo-1,2-pentamethylene-imidazolidine hydrochloride.
20. 3-[4'-(1'-parafluorophenyl - 1' - oxo)-butyl]-5-oxo-1,2-pentamethylene-imidazolidine hydroiodide.
21. 3-benzyl-5-oxo-1,2-pentamethylene-imidazolidine.
22. 4-methyl-5-oxo-1,2-pentamethylene-imidazolidine.
23. 3,4 - dimethyl - 5 - oxo-1,2-pentamethylene-imidazolidine.
24. 3,4 - dimethyl - 5 - oxo-1,2-pentamethylene-imidazolidine hydrochloride.
25. A compound of the formula

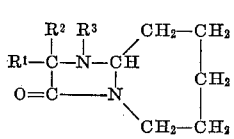

wherein $R^1$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^2$ and the carbon atom to which both are attached, a carbocyclic ring of from 3 to 9 carbon atoms and selected from the group consisting of a saturated ring and an ethylenically unsaturated ring; and $R^2$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^1$ and the carbon atom to which both are attached, a carbocyclic ring of from 3 to 9 carbon atoms and selected from the group consisting of a saturated ring and an ethylenically unsaturated ring; and $R^3$ is a hydrocarbon radical selected from the group consisting of lower alkyl, lower alkenyl, lower alkynyl, lower cycloalkyl, phenyl and monocarbocyclic ar(lower)alkyl.

26. A compound of the formula

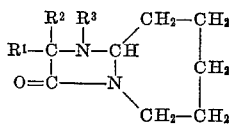

wherein $R^1$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^2$ and the carbon atom to which both are attached, a carbocyclic ring of from 3 to 9 carbon atoms and selected from the group consisting of a saturated ring and an ethylenically unsaturated ring; and $R^2$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^1$ and the carbon atom to which both are attached, a carbocyclic ring of from 3 to 9 carbon atoms and selected from the group consisting of a saturated ring and an ethylenically unsaturated ring; and $R^3$ is carboxylic acid acyl selected from the group consisting of (lower)alkyl carbonyl, (lower)alkyl-keto-(lower)alkylene, phenyl-keto-(lower)alkylene and para-fluorophenyl-keto-(lower)alkylene.

27. A compound of the formula

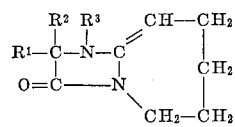

wherein $R^1$ is a member selected from the group consisting of a hydrogen atom, lower alkyl, hydroxy(lower)alkyl, (lower)alkylthio(lower)alkyl, phenyl lower)alkyl, indolyl(lower)alkyl, imidazole(lower)alkyl, phenyl, benzyl substituted by at least one substituent selected from the group consisting of hydroxy, bromo and iodo and, together with $R^2$ and the carbon atom to which both are attached, a carbocyclic ring of from 3 to 9 carbon atoms and selected from the group consisting of a saturated ring and an ethylenically unsaturated ring; and $R^2$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^1$ and the carbon atom to which both are attached, a carbocyclic ring of from 3 to 9 carbon atoms and selected from the group consisting of a saturated ring and an ethylenically unsaturated ring; and $R^3$ is a member selected from the group consisting of a hydrogen atom, lower alkyl, lower alkenyl, lower alkynyl, (lower)alkyl-carbonyl, amidobenzene, nitroso, primary amino, (lower)alkyl (secondary)amino, phenyl(lower)alkyl, (lower)alkylamido, phenyl-keto-(lower)alkylene and para-fluorophenyl-keto-(lower)alkylene.

28. An acid addition salt of a compound of the formula

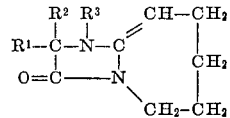

wherein $R^1$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^2$ and the carbon atom to which both are attached, a carbocyclic ring of from 3 to 9 carbon atoms and selected from the group consisting of a saturated ring and an ethylenically unsaturated ring; and $R^2$ is a member selected from the group consisting of a hydrogen atom, lower alkyl, hydroxy(lower)alkyl, (lower)alkylthio(lower)alkyl, phenyl(lower)alkyl, indolyl(lower)alkyl, imidazole(lower)alkyl, phenyl, benzyl substituted by at least one substituent selected from the group consisting of hydroxy, bromo and iodo and, together with $R^1$ and the carbon atom to which both are attached, a carbocyclic ring of from 3 to 9 carbon atoms and selected from the group consisting of a saturated ring and an ethylenically unsaturated ring; and $R^3$ is a member selected from the group consisting of a hydrogen atom, lower alkyl, lower alkenyl, lower alkynyl, (lower)alkyl-carbonyl, amidobenzene, nitroso, primary amino, (lower)alkyl (secondary)amino, phenyl(lower)alkyl, (lower)alkylamido, phenyl-keto-(lower)alkylene and para-fluorophenyl-keto-(lower)alkylene.

References Cited
UNITED STATES PATENTS 3,002,000    9/1961    Tietze et al. _____ 260—309.6

FOREIGN PATENTS 1,082,268    10/1960    Germany.

WALTER A. MODANCE, *Primary Examiner.*

N. S. MILESTONE, *Examiner.*

N. TROUSOF, *Assistant Examiner.*